DISPENSING CONTAINER WITH EXTENSIBLE POURING SPOUT

Original Filed Jan. 13, 1953 6 Sheets-Sheet 1

Inventor
CARROLL R. ALDEN
by: Carlson, Pitzner, Hubbard & Wolfe
Attys.

DISPENSING CONTAINER WITH EXTENSIBLE POURING SPOUT

Original Filed Jan. 13, 1953 6 Sheets-Sheet 2

Inventor
CARROLL R. ALDEN
by: Carlson, Pitzner, Hubbard & Wolfe
Attys.

DISPENSING CONTAINER WITH EXTENSIBLE POURING SPOUT

Original Filed Jan. 13, 1953 6 Sheets-Sheet 3

Inventor
CARROLL R. ALDEN
by: Carlson, Pitzner, Hubbard + Wolfe
Attys.

DISPENSING CONTAINER WITH EXTENSIBLE POURING SPOUT

Original Filed Jan. 13, 1953 6 Sheets-Sheet 4

Inventor
CARROLL R. ALDEN
by: Carlson, Pitzner, Hubbard & Wolfe
Attys.

DISPENSING CONTAINER WITH EXTENSIBLE POURING SPOUT

Original Filed Jan. 13, 1953 6 Sheets-Sheet 5

Inventor
CARROLL R. ALDEN by: Carlson, Pitzner, Hubbard & Wolfe
Attys.

DISPENSING CONTAINER WITH EXTENSIBLE POURING SPOUT
Original Filed Jan. 13, 1953 6 Sheets-Sheet 6
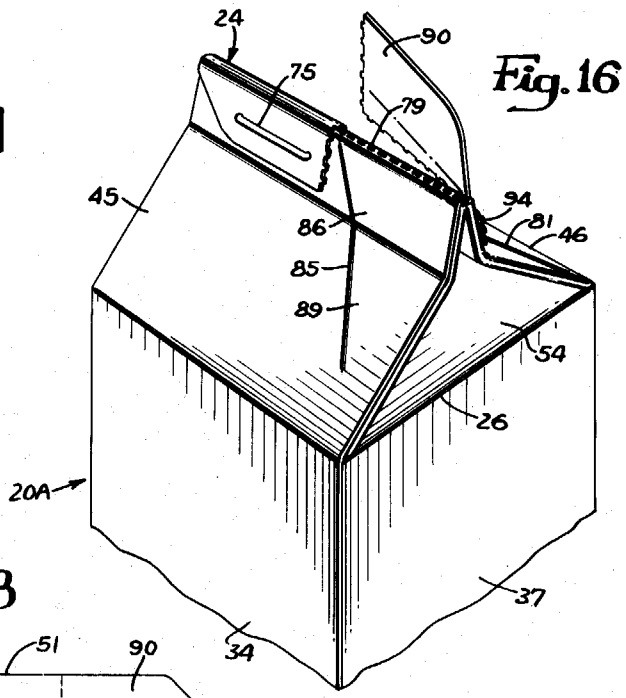
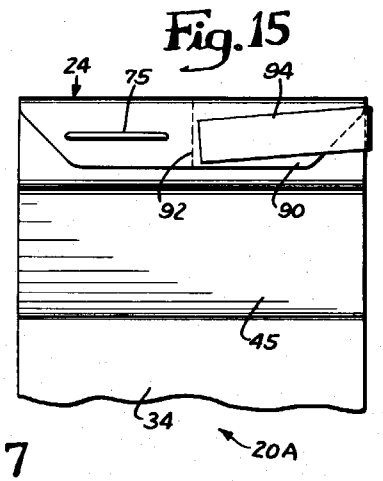
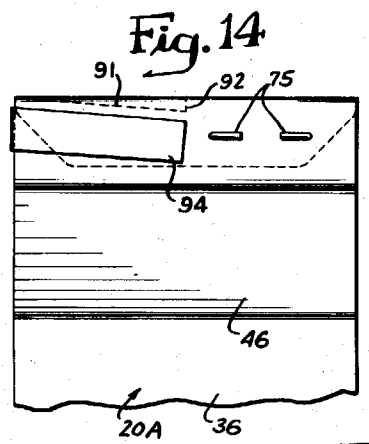
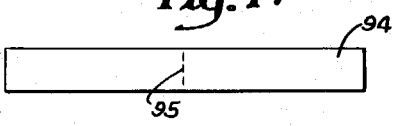
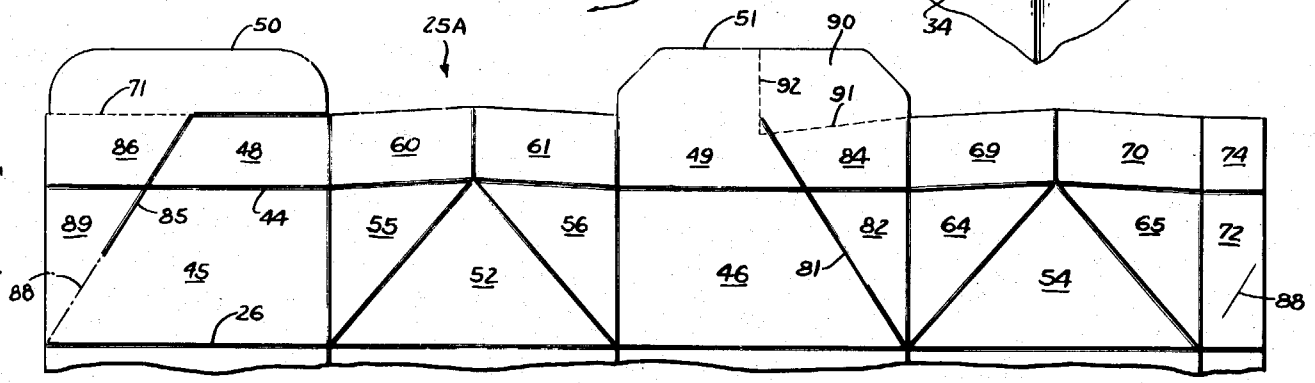
Inventor
CARROLL R. ALDEN
by: Carlson, Pitzner, Hubbard & Wolfe
Attys.

United States Patent Office

Re. 25,021
Reissued Aug. 8, 1961

25,021

DISPENSING CONTAINER WITH EXTENSIBLE POURING SPOUT

Carroll R. Alden, Ada, Ohio, assignor to Ex-Cell-O Corporation, Detroit, Mich., a corporation of Michigan Original No. 2,750,095, dated June 12, 1956, Ser. No. 331,021, Jan. 13, 1953. Application for reissue Jan. 16, 1957, Ser. No. 634,597

1 Claim. (Cl. 229—17)

Matter enclosed in heavy brackets [ ] appears in the original patent but forms no part of this reissue specification; matter printed in italics indicates the additions made by reissue.

The present invention pertains in general to packaging and, more specifically, to a gable topped container of the general type disclosed in U.S. Patent No. 2,025,477, issued December 24, 1935, to Henry T. Scott, in copending application of Carroll R. Alden, Serial No. 139,628, filed Januay 20, 1950, *now Patent No. 2,751,137*, and in copending applications of Herbert M. Kieckhefer, Serial No. 331,666, filed January 16, 1953, *now Patent No. 2,987,234*, and Edwin P. Cox et al., Serial No. 333,-134, filed January 26, 1953, *now abandoned*.

The invention finds particular, but by no means exclusive, utility in disposable containers adapted for distribution of milk and other dairy products.

A container of the foregoing character is customarily erected from a flat blank of sheet stock which has been impressed with an appropriate pattern of score lines, the latter defining a plurality of side panels together with corresponding upper and lower panel extension flaps or closure members. The usual procedure in setting up such a container is to form the blank into a polygonal tube open at both ends and then to close the lower or bottom panel extensions, retaining them in place by means of a suitable adhesive. The exposed surfaces of the container may then be coated or impregnated with a leakproof film by immersion in a paraffin bath, for example. Following this operation, the container may be filled with the particular product to be contained therein and the top sealed.

In general, it is the aim of the present invention to provide a container of the type just recited and having incorporated into its top end closure an extensible, sanitarily protected pouring spout which may be opened easily for precise, dripless dispensing of the contents of the container.

More specifically, it is an object of the invention to provide a gable topped container of the character set forth above and wherein the pouring spout is of pitcher-like form and rendered accessible as a result of partial disintegration or disassembly of the top end closure by application of fingertip forces only, there being no necessity for the use of a knife or other implement.

A further object of the invention is to provide a gable topped container of the type just specified and wherein the top closure includes an arrangement for enabling the user to manipulate the pouring spout both into extended or operative position and into reclosed position with exceptional ease and facility, yet possessing sufficient strength to permit normal handling of the container prior to and after initial opening by the user.

Still another object of the invention is to provide a blank susceptible of being formed into a container of the character set forth above.

Other objects and advantageous features will become apparent from the following detailed description, taken together with the accompanying drawings, in which:

FIGS. 14 and 15 are fragmentary front and rear elevations showing the upper portion of a modified form of container also illustratively embodying the present invention.

FIG. 16 is a fragmentary perspective view showing the upper portion of the modified container of FIGS. 14 and 15.

FIG. 17 is a plan view of a severable reinforcing strip used with the modified container.

FIG. 18 is a fragmentary plan view detailing the upper portion of the inside face of a flat blank from which the modified form of container of FIGS. 14 to 16 may be constructed.

Figure 1:
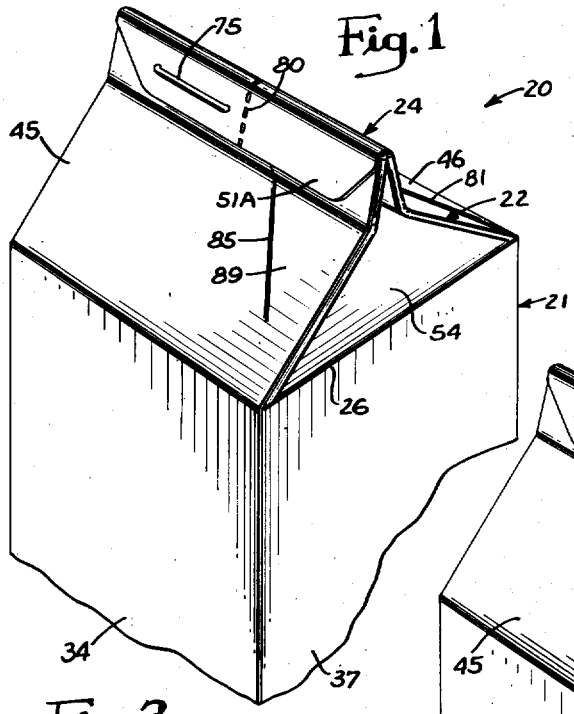
FIGURE 1 is a fragmentary perspective view showing the upper portion of an illustrative container embodying the present invention.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claim.

Referring more specifically to FIGS. 1 to 12, there is shown an exemplary container 20 embodying the present invention. The container 20 is formed from paper or other suitable sheet material and is self-sustaining in shape, being coated or impregnated with a suitable substance to render it fluid tight and capable of holding liquids such as milk. The container 20 comprises a tubular body 21 which, in the present instance, happens to be of substantially square cross section. At its base, the body 21 is provided with a suitable bottom closure (not shown), the details of which are of no immediate concern here. The upper end of the body 21 terminates in what will be recognized as the familiar gable top end closure 22 which is surmounted by a central laminar rib or truss 24. The top end closure 22 has incorporated therein a novel arrangement for dispensing the contents of the container.

Figure 13:
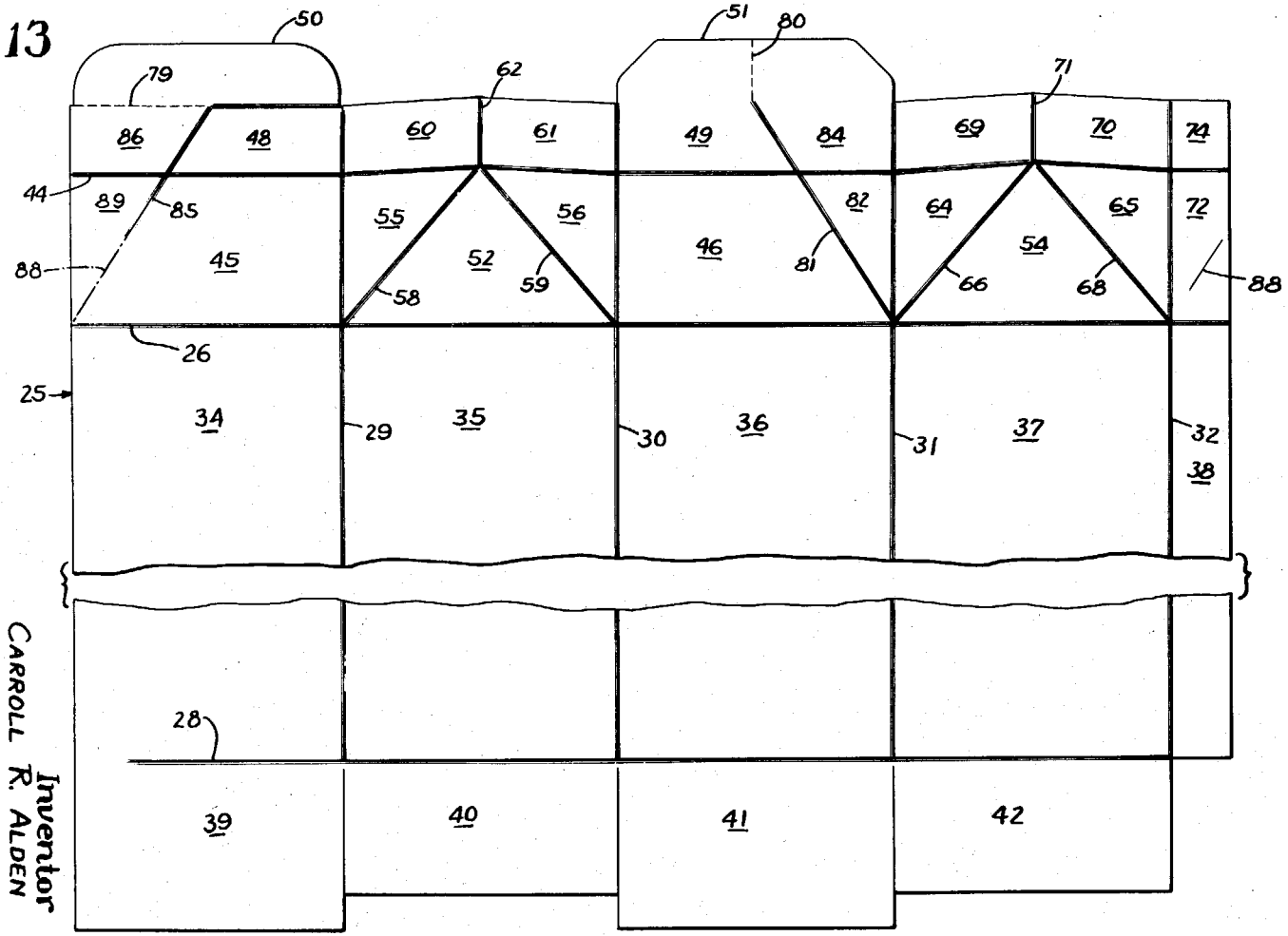
FIG. 13 is a plan view detailing the inside face of a flat blank from which the illustrative container of FIGS. 1 to 12 may be constructed.

Preferably, the container 20 is fashioned from a flat blank 25 of heavy paper stock or other suitable sheet material, the inside face of such blank being illustrated in FIG. 13. By means of an appropriate pattern of score lines, the blank 25 is divided into a plurality of panels and areas which are utilized for the walls of the container and the closure parts when the container is erected.

The central and major area of the blank 25 becomes the body 21 of the container and is defined by spaced apart transverse score lines 26, 28 running in substantially parallel relation across the face of the blank. Intersecting the lines 26, 28 at spaced intervals therealong are a series of perpendicular score lines 29, 30, 31 and 32 which define, in the central and major area of the blank, side panels 34, 35, 36 and 37, together with a fractional side panel or glue flap 38. When the container is erected, the latter is adhesively secured in overlying relation with the inside face of the side panel 34. Connected to the lower edges of the side panels along the lower transverse score line 28 are a plurality of panel extensions or bottom closure flaps 39, 40, 41 and 42 which may be of well-known form.

Integral with the upper ends of the side panels but separated therefrom by the transverse score line 26 are a plurality of panel extensions which give the top of the container 10 its characteristic gable shape. These areas include a transverse score line 44 generally parallel to the score line 26 and spaced between the latter and the top edge of the blank 25. The areas below the line 44 define the roof panels and end panels of the top closure 22, while the areas above the line 44 define the parts of the central laminar rib 24.

Accordingly, alternate side panels 34, 36 have respectively connected therewith inclined roof panels 45, 46, The latter, in turn, are connected with outer rib panels 48, 49 terminating, respectively, in tuck-in flap 50 and fold-over flap 51. Similarly, alternate side panels 35, 37 have connected therewith along the transverse score line 26 triangular end panels 52 and 54. The end panel 52 is flanked by triangular fold-back panels 55, 56 connected along converging score lines 58, 59 which start at the intersections between the corner score lines 29, 30 and the transverse score line 26, converging upwardly and intersecting at the transverse score line 44. Inner rib panels 60, 61 are connected to the panels 55 and 56 along the score line 44 and are connected to each other along short vertical score line 62 which runs from the apex of the end panel 52 to the top edge of the blank. By the same token, the end panel 54 is flanked by fold-back panels 64, 65 connected along converging score lines 66, 68. Fold-back panels 64, 65 are connected to inner rib panels 69, 70 along the score line 44, the panels 69, 70 being connected with each other along score line 71.

The glue flap 38 also has panel extensions 72, 74 integral therewith. When the container 20 is erected, the extensions 72, 74 respectively overlie the marginal edge portions of the inside faces of the roof panel 45 and the rib panel 48.

Figure 7:
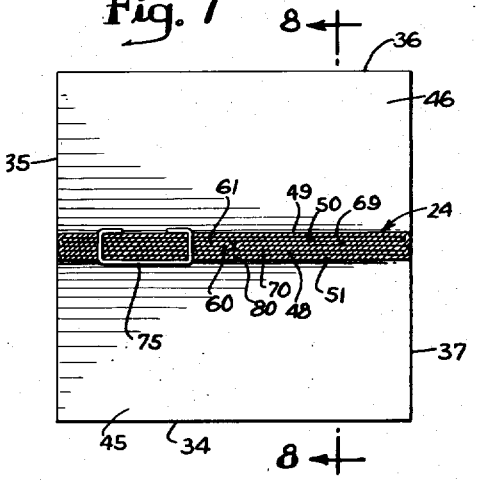
FIG. 7 is a horizontal sectional view through the central laminar rib of the container of FIG. 1 and taken in the plane of the line 7—7 in FIG. 8.
Figure 8:
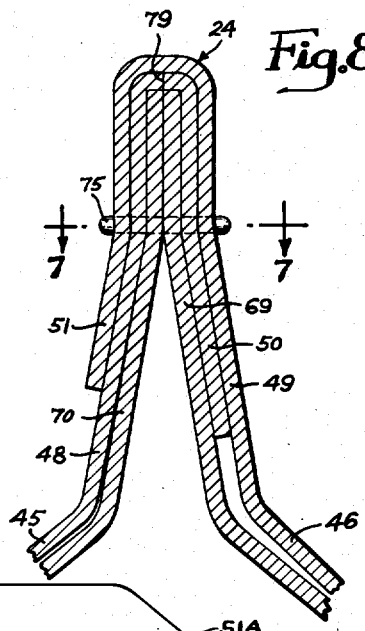
FIG. 8 is an enlarged, fragmentary vertical sectional view through the central rib structure of the container, taken in the plane of the line 8—8 in FIG. 7.
Figure 9:
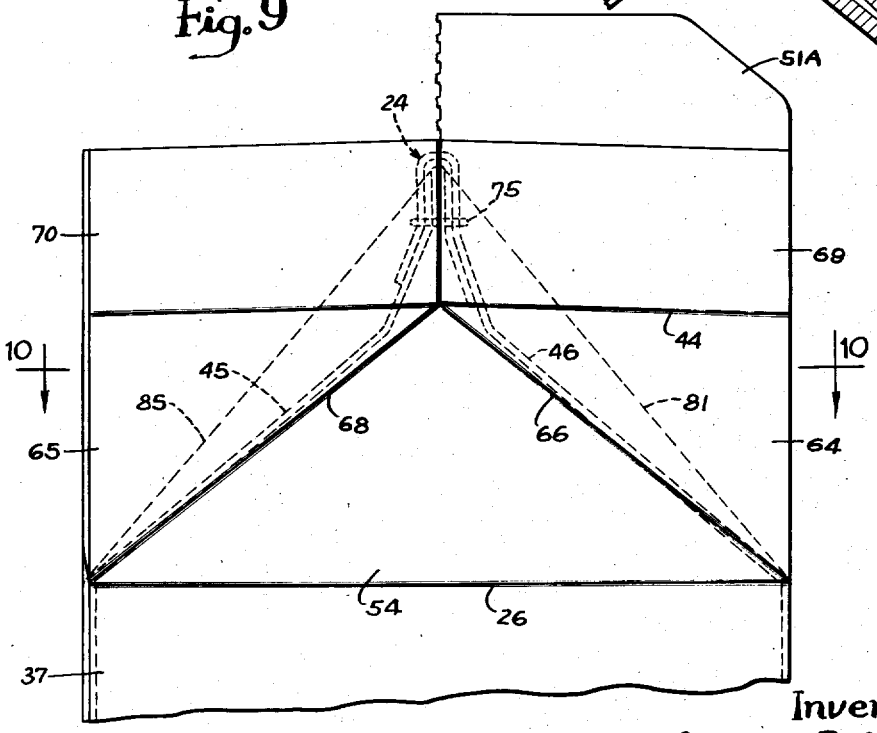
FIG. 9 is an elevational view of the front face of the extensible pouring spout as it passes through dead center.

To transform the blank 25 into the completed container 20 illustrated in FIG. 1, the blank is first folded upon itself to form a flat tube and the glue flap 38, together with its extensions 72, 74, is adhesively secured to the inside faces of the panels 34, 45 and 48 adjacent the left marginal edges thereof. The flat tube is then erected into one of square cross section and the bottom closure is completed. If not moistureproofed earlier, the open container is coated or impregnated, as by dipping in a paraffin bath. The container is then filled and its top closure parts are infolded into gable-like form. During the course of such action, the tuck-in flap 50 is tucked between the infolded rib panels 61, 69 and 49, as shown in FIGS. 7 and 8, reinforcing the rib 24. By the same token, the flap 51 is folded down against the outer face of the rib panel 48. The rib parts are then sealed in closed position by the application of heat and pressure against the outside faces of the rib 24. This structure may be further reinforced, as by means of a staple 75 or by a high strength thermoplastic adhesive.

Figure 5:
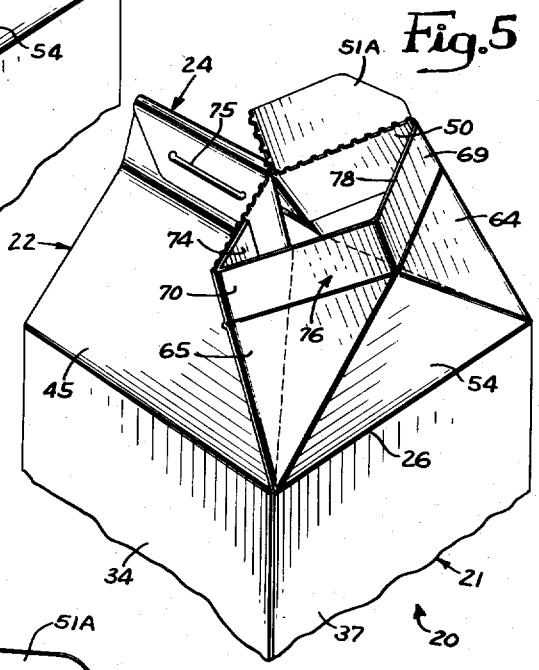
Figure 6:
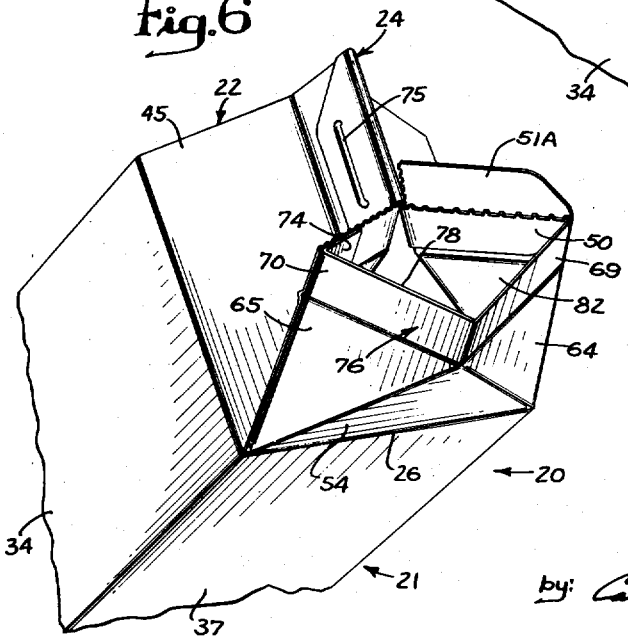

As shown particularly in FIGS. 5 and 6, an extensible, sanitarily protected pouring spout 76 of pitcher-like form is incorporated into the top closure of the container 20 and rendered accessible as a result of partial disintegration or, in other words, partial disassembly, of the central laminar rib 24. This is accomplished in large measure by taking advantage of the angular arrangement of score lines defining the triangular end panels and fold-back panels of the top closure. The pouring spout 76 accordingly comprises the triangular end panel 54, triangular fold-back panels 64, 65, rib panels 69, 70, adjacent portions of rib panels 48, 49, and adjacent portions of inclined roof panels 45, 46 (FIGS. 1, 5 and 6). The rib panels 69, 70 provide the spout 76 with a free upper edge 78 which is traversed by the fluid poured from the container 20. This edge affords excellent pouring and cut-off characteristics. Moreover, the pouring edge 78 and its adjacent marginal areas remain sealed within the structure of the laminar top rib 24 and hence are subject to complete sanitary protection up to the time the container 20 is opened by the user.

In order to make the pouring spout 76 easily accessible to the user and yet maintain adequate strength and sanitary protection in the top end closure, the laminar rib 24 is divided longitudinally into a fixed portion and a disintegrable portion, the fixed portion having the staple 75 or an equivalent permanent adhesive juncture. As shown in FIG. 13, the rib panel 48 has a transverse tear line 79 starting at the left edge of the blank 25 and extending about halfway along the fold line of the tuck-in flap 50. In addition, the rib panel 49 has a relatively short tear line 80 which extends from the approximate center of the panel 49 upwardly to the top edge of the blank, bisecting the fold-over flap 51. In this instance, the tear lines 79, 80 happen to be defined by perforations but it will be appreciated that these lines may be defined by other equivalent expedients.

Figure 2:
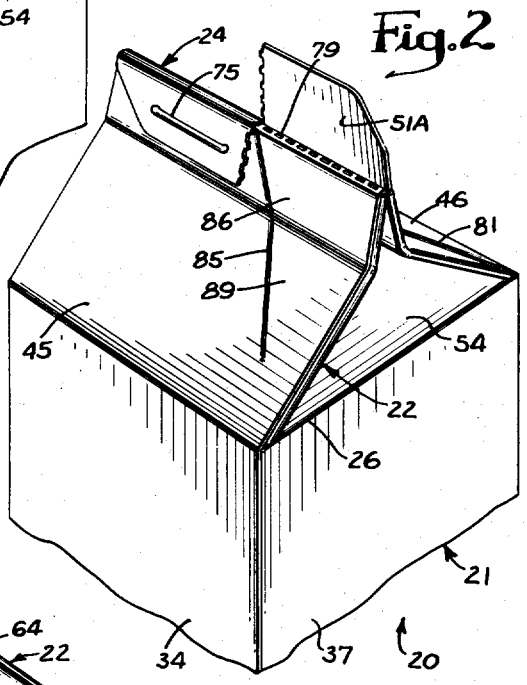
FIGS. 2, 3, 4, 5 and 6 are fragmentary perspective views similar to FIG. 1 but showing sequentially various steps in opening the container and placing the pouring spout in operative condition.
Figure 3:
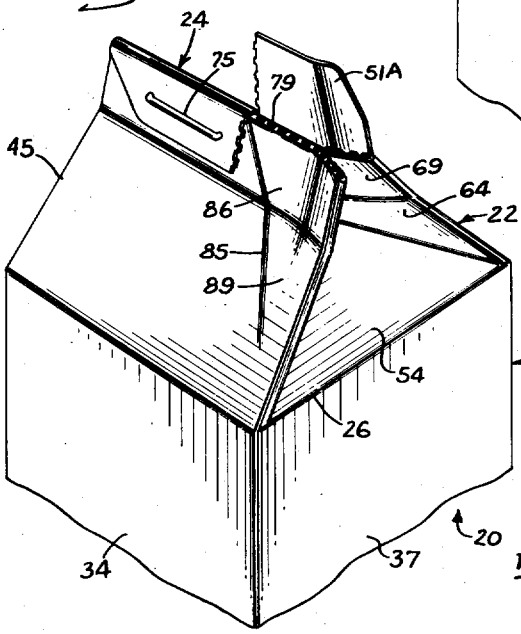

With the container 20 in the unopened condition illustrated in FIG. 1, the first step in opening the same is to pull upwardly on unstapled portion 51A of the fold-over flap 51. The portion 51A separates from the stapled portion along the tear line 80 and, when fully raised as shown in FIG. 2, exposes the tear line 79 between the tuck-in flap 50 and the remainder of the rib panel 48. By gripping the fold-back panel 65 and the overlying portion of the roof panel 45 with the thumb and forefinger of one hand, and gripping the fold-back panel 64 and the overlying portion of the roof panel 46 with the thumb and forefinger of the other hand, and pushing in opposite directions with both thumbs, these two sets of panels or wings can be caused to separate progressively along the tear line 79, as indicated in FIGS. 3 and 4.

Figure 10:
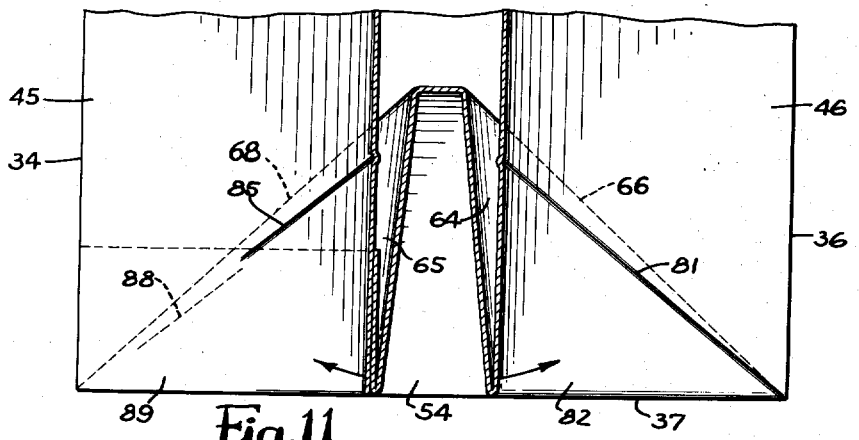
FIGS. 10, 11 and 12 are enlarged, fragmentary, horizontal sectional views taken through the pouring spout approximately in the plane of the line 10—10 in FIG. 9 and showing sequentially certain steps in manipulating the spout from its inactive to its active position.

Means is provided in the container 20 for positively effecting distention of the pouring spout 76 as an incident to folding back of its components panels or wings. This is accomplished by the use of a novel toggle-like arrangement for hinging the wings or panel sets defining the spout 76, such arrangement being adapted to shift the spout 76 from collapsed to extended condition with a definite snap action. Referring once more to FIG. 13, it will be noted that the roof panel 46 and the rib panel 49 are impressed with a preformed angular score line 81 starting at the intersection of the score lines 26, 31, 66 and terminating at the lower end of the tear line 80 at the center of the rib panel 49. The line 81 makes a somewhat smaller angle with the corner score line 31 than the line 66. Consequently, the line 81 defines in the roof panel 46 a triangular subpanel 82 and defines in the rib panel 49 a trapezoidal subpanel 84, both having a substantially shorter common dimension along the score line 44 than the spout panels 64, 69. The roof panel 45 and the rib panel 48 are impressed with a preformed angular score line 85 similar to the score line 81 but in this instance starting in the roof panel 45 at the inner edge of the glue flap area and terminating at the inner end of the tear line 79 at the center of the rib panel 48. The line 85 defines in the rib panel 48 a trapezoidal subpanel 86 and, together with an alined slit 88 in the glue flap, defines a triangular subpanel 89. Both the subpanels 86 and 89 have a substantially shorter common dimension along the score line 44 than the spout panels 65, 70. In the unopened container, as indicated in FIG. 10, the angular score lines 81, 85 are situated outwardly in spaced relation to the fold lines 66, 68 which respectively join adjacent fold-back panels 64, 65 to triangular end panel 54.

Figure 4:
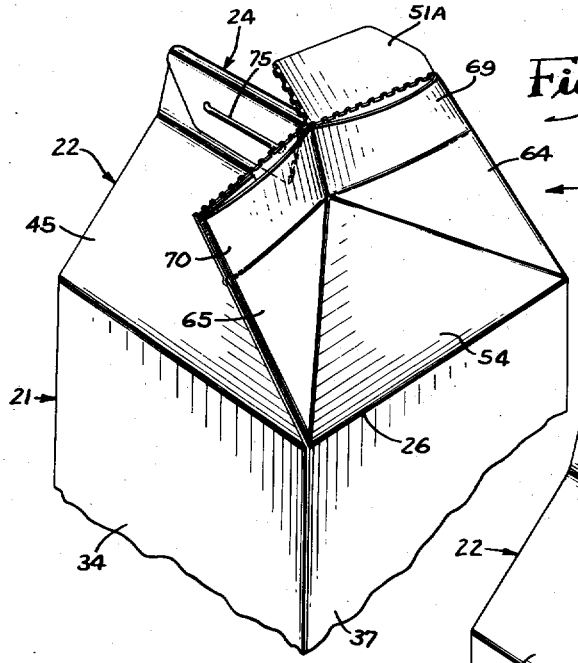
Figure 11:
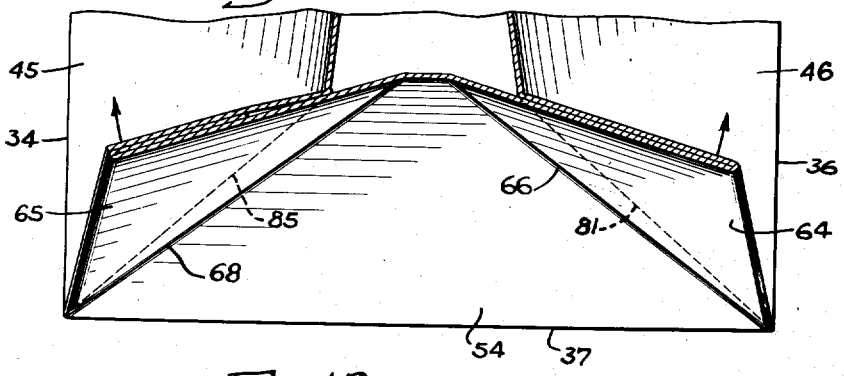
Figure 12:
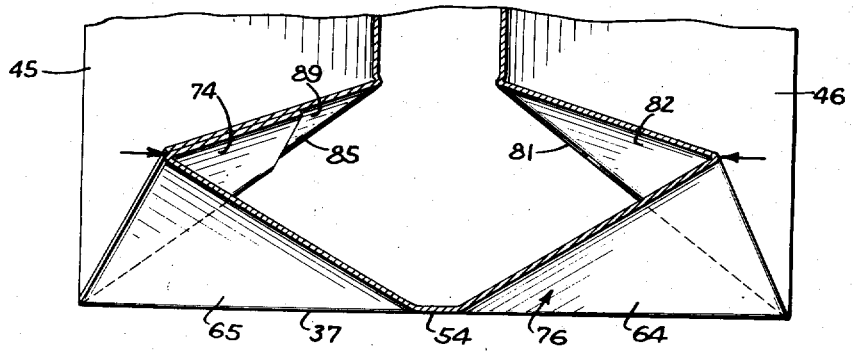

By reason of their inherent stiffness, the pouring spout panels and subpanels 65, 70, 89 and 86, which comprise the left-hand wing as viewed in FIGS. 3 to 6, hinge as a unit about the score line 85 when subjected to outward thumb pressure. In like manner, the pouring spout panels and subpanels 64, 69, 82 and 84, which comprise the right-hand wing, hinge as a unit about the score line 81 when subjected to outward thumb pressure. With the pouring spout 76 in the completely collapsed condition as indicated in FIGS. 2 and 10, the hinge score lines 81, 85 simply lie in the respective planes of their associated inclined roof panels 45, 46 and rib panels 48, 49. As the spout wings are subjected to increased opposed thumb pressures and progressively increasing angular movement, as indicated in FIGS. 4 and 11, the hinge score lines 81, 85 tend to straighten out and occupy a common plane. This is due in part to the natural tendency of paper and other sheet stock to fold along a straight line. Moreover, the toggle action between the panels 54, 64, 65, 69, 70 and their hinge lines 81, 85 springs the roof panels 45, 46 and the rib panels 48, 49 outwardly and subjects panels 54, 64, 65, 69 and 70 to considerable compression. By the time these members have passed from the position of FIGS. 4 and 11 to the dead center position of FIG. 9, this compression reaches a maximum and actually bows such members slightly as shown in FIG. 4. This is due to the fact that the roof panels 45, 46 and the rib panels 48, 49 in the region of the hinge lines 81, 85 have undergone maximum deformation or spring, their approximate initial position being indicated in dot-dash outline in FIG. 9. Substantially as the spout passes through dead center, the common plane of the now straightened hinge score lines 81, 85 is situated outboard from the plane initially occupied by the triangular end panel 54 and each line 81, 85 acts as a fulcrum having pivotal engagement with an associated one of the fold-back panels 64, 65. The net effect of such relationship is that, once brought near dead center position, the pouring spout 76 snaps quickly and positively through dead center to an extended position upon application of extremely light finger tip forces. With the spout 76 in the condition shown in FIG. 12, a slight inward squeeze applied at its lateral edges will distend the spout into its fully extended, operative position. Pouring may then be initiated by inclining the container 20 to the desired angle, as illustrated in FIG. 6.

Collapse of the pouring spout 76 and reclosure of the container 20 may be effected with ease and facility. The user need only press lightly on the spout panel 54 until the spout snaps through dead center toward collapsed position. The back-folding manipulations of the wings should then be reversed and the flap 51A downfolded to protect and retain the members 69, 70, 82 and 86 together.

Turning now to FIGS. 14 to 18, inclusive, there is shown a slightly modified form of the invention embodied in an illustrative container 20A and a blank 25A for such container. In view of the fact that most of the elements of the container and blank 20A, 25A are substantially identical with those of the container and blank 20, 25 described earlier herein, like reference numerals have been used to designate elements common to both embodiments of the invention. In view of the fact that most elements are common to both embodiments of the invention, a detailed description of the container 20A and blank 25A would be superfluous at this point. Reference will be had, therefore, simply to the distinguishing features of the container 20A and its blank 25A.

As indicated in FIG. 16, one distinguishing feature of the container 20A is the fact that liftable portion 90 of the fold-over flap 51 is made completely severable from the top rib 24. This enhances convenient usage of the pouring spout since the portion 90 sometimes tends to obstruct the user's view of the receptacle into which the pouring spout is discharging the contents of the container. To accomplish the foregoing objective with a minimum sacrifice of strength in the disintegrable portion of the top rib 24 prior to initial opening of the container, the rib panel 49 has a tear line 91 (FIGS. 14 and 18) extending from the upper left-hand corner of the rib panel 69 leftwardly and downwardly to a point below the center of the rib panel 49. At this point, the tear line 91 intersects central tear line 92 which runs upwardly and terminates at the top edge of the blank, bisecting the fold-over flap 51.

As in the case of the container 20, the non-disintegrable portion of the top rib 24 in the container 20A may be rigidly secured together by means of the staple 75 or by an appropriate permanent adhesive juncture. However, the disintegrable portion of the rib 24 may conveniently be strengthened as by means of a reinforcing strip 94 adhesively secured to the exposed outer faces of the flap portion 90 and the rib panel 49. The reinforcing strip 94 may be in the nature of a piece of removable cellulose acetate tape or, on the other hand, may be secured in place with a more permanent adhesive juncture and provided with a central tear or perforation line 95 severable by the user as he opens the container.

It will be noted by those skilled in the art that there has been provided a container which eminently fulfills the objectives set forth earlier herein. The container is easy to open and reclose by the application of light finger pressures, and the pouring spout is readily accessible to the user but sanitarily protected up to the time the container is opened. Although some of parts of the top closure are deliberately weakened to facilitate opening, the top closure possesses ample mechanical strength and fluid-tight integrity to preclude accidental opening or leakage during handling or transit prior to initial opening by the user.

I claim as my invention:

A gable top container of paperboard or the like and comprising, in combination, a tubular body having a bottom closure thereon, a pair of opposed roof panels inclined toward each other and overlying said body, a pair of opposed triangular end panels in-folded between said roof panels from the opposite gable ends formed by the latter, two pairs of triangular fold-back panels each pair of which is integral with a respective one of said in-folded triangular end panels along fold lines which are substantially in contact with said roof panels, said fold-back panels being folded against the undersides of said roof panels, a plurality of inner and outer rib panels surmounting said roof panels and said triangular end and fold-back panels, *a tuck-in flap connected along a folding line to one of said outer rib panels and folded in interlocking sandwiched relation between another one of said outer rib panels and said inner rib panels, a fold-over flap connected to said other outer rib panel and folded in overlying relation with the outside face of said one outer rib panel,* said rib panels *and said tuck-in and fold-over flaps together* defining a central laminar top rib divided longitudinally into a fixed portion and a movable portion, *means immovably secured to said fixed portion for retaining the same intact, means defining a perforation line between said tuck-in flap and said one outer rib panel extending longitudinally of said rib from one end thereof to a terminal point at the central portion of the same, means defining a perforation line in said fold-over flap extending from the depending edge of said fold-over flap to a terminal point at the top central portion of said rib coinciding substantially with the terminal point of said perforation line of said tuck-in flap,* a sanitarily protected extensible pouring spout housed in collapsed condition within said container and defined in part by one of said triangular end panels and an adjacent pair of said fold-back panels and an adjacent pair of said inner rib panels, said spout also being defined by adjacent portions of said roof panels and outer rib panels, said spout having a dead center position representing a transition between its collapsed condition and its extended condition, and means for positively snapping said pouring spout with a toggle-like action in either direction through said dead center position between its collapsed condition and its extended condition, said means comprising preformed angular score lines in said roof panels flanking said spout and extending from terminal points adjacent the lower outer edges of said roof panels to a common terminal point at the top center of said rib *coinciding substantially with the common terminal point of said perforation lines of said tuck-in flap and said fold-over flap,* said angular score lines being situated outwardly in spaced relation to said fold lines joining said adjacent pair of said fold-back panels and said one of said triangular end panels so as to lie in a common plane as said spout is opened and substantially as it passes through dead center, the common plane being situated substantially outboard from the plane initially occupied by said one triangular end panel, each said angular score line in said common plane defining a fulcrum disposed in pivotal engagement with an associated one of said fold-back panels of said spout.

References Cited in the file of this patent
or the original patent

UNITED STATES PATENTS

| | | |
|---|---|---|
| 1,157,462 | Van Wormer | Oct. 19, 1915 |
| 2,198,119 | Krengel | Apr. 23, 1940 |
| 2,241,836 | Wentz | May 13, 1941 |
| 2,300,703 | Ray | Nov. 3, 1942 |
| 2,321,139 | Gruger | June 8, 1943 |
| 2,329,797 | Strack | Sept. 21, 1943 |
| 2,336,503 | Ringler | Dec. 14, 1943 |
| 2,362,862 | Sidebotham | Nov. 14, 1944 |
| 2,634,896 | Groveno | Apr. 14, 1953 |

FOREIGN PATENTS

| | | |
|---|---|---|
| 186,983 | Switzerland | Oct. 15, 1936 |
| 95,342 | Sweden | Apr. 5, 1939 |
| 395,645 | Canada | Apr. 1, 1941 |
| 1,008,984 | France | Feb. 27, 1952 |